United States Patent [19]
Jorgensen et al.

[11] 3,789,946
[45] Feb. 5, 1974

[54] DUAL STEERING SYSTEM FOR ARTICULATED VEHICLES

[75] Inventors: Stanley A. Jorgensen, Oswego; Stanley B. Adams, Yorkville, both of Ill.

[73] Assignee: Caterpillar Tractor Co., Peoria, Ill.

[22] Filed: Jan. 31, 1972

[21] Appl. No.: 222,073

[52] U.S. Cl. ............................................ 180/79.2 B
[51] Int. Cl. ............................................... B62d 5/06
[58] Field of Search ............. 180/79.2 B, 79.2 R, 51

[56] References Cited
UNITED STATES PATENTS

| | | | |
|---|---|---|---|
| 3,412,822 | 11/1968 | Canning | 180/79.2 B |
| 2,614,644 | 10/1952 | Gustafson | 180/79.2 B |
| 3,363,711 | 1/1968 | Knell et al. | 180/79.2 B |

*Primary Examiner*—Kenneth H. Betts
*Assistant Examiner*—John A. Pekar
*Attorney, Agent, or Firm*—Stephen Westbrook

[57] ABSTRACT

A steering system for an articulated vehicle having a central vertical pivot and steering axis includes a follow up linkage pivotally connected to a follow-up arm for follow up steering of the vehicle, and neutralizing means to render the follow-up linkage insensitive to articulation of the vehicle for direct steering of the vehicle. The neutralizing means includes means pivotally mounting the follow-up arm on the vehicle frame, and linkage means operable to pivot the follow-up arm to a configuration wherein the pivotal connection of the follow-up arm to the follow-up linkage is disposed on the vehicle pivot axis.

Articulation limit means is also provided to limit articulation of the vehicle when in the direct steering mode comprising a control arm attached to one frame of the vehicle and intersecting the vehicle pivot axis, and a lever having one end pivotally connected to the control arm at the vehicle pivot axis and a second end connected by a control link to the vehicle steering gear. Adjustable set screws on the control arm limit pivoting of the control arm with respect to the lever, whereby upon the control arm reaching the limit of rotation with respect to the lever, the steering gear will be actuated to stop further articulation of the vehicle.

5 Claims, 3 Drawing Figures

DUAL STEERING SYSTEM FOR ARTICULATED VEHICLES

BACKGROUND OF THE INVENTION

Articulated wheel-type vehicles have become very popular as material handling vehicles such as tractors and loaders. Such vehicles comprise a forward frame and a rearward frame joined together by a vertical axis pivot joint. The pivot axis then serves as the steering axis of the vehicle, providing a vehicle with a smaller turning radius than that of similar wheelbase non-articulated vehicles. Because articulated vehicles have a relatively small turning radius, they are quite maneuverable, even when large in size.

Articulated wheel-type vehicles are also adaptable to high speed operation. Thus such vehicles are often used for both close quarter maneuvering and high speed hauling functions. Steering of the vehicle is afforded by double-acting hydraulic cylinders connected to the front and rear portion of the vehicle on each side of the pivot axis. A steering wheel provided at an operator's station on one frame of the vehicle controls a mechanical steering gear assembly which actuates a hydraulic control valve to direct fluid to the steering jacks. A follow-up arm attached to the other frame of the vehicle, is connected to the steering gear by a follow-up link to provide automotive-type follow-up steering of the vehicle. Follow-up steering is desirable for high speed operation because only slight steering corrections are required to assure satisfactory control of the vehicle.

However, when maneuvering in tight quarters where considerable articulation of the vehicle is necessary, direct or "jerk" type steering provides easier handling of the vehicle.

BRIEF DESCRIPTION OF THE INVENTION

Thus, it is an object of this invention to provide a steering system for an articulated vehicle that may be selectively controlled to function as either a follow-up steering system or direct steering system.

This objective is achieved by providing a conventional articulated vehicle having a follow-up steering system with means to selectively neutralize or inactivate the follow-up linkage of the steering system.

Inactivation of the follow-up steering linkage is achieved by pivoting the follow-up arm and follow-up link of the vehicle until the point of connection of the follow-up link to the follow-up arm is disposed over the pivot axis of the vehicle, whereby pivoting of the follow-up arm around the vehicle pivot axis will not affect the follow-up linkage.

DETAILED DESCRIPTION OF THE PREFERRED EMBODIMENT

Figure 1:
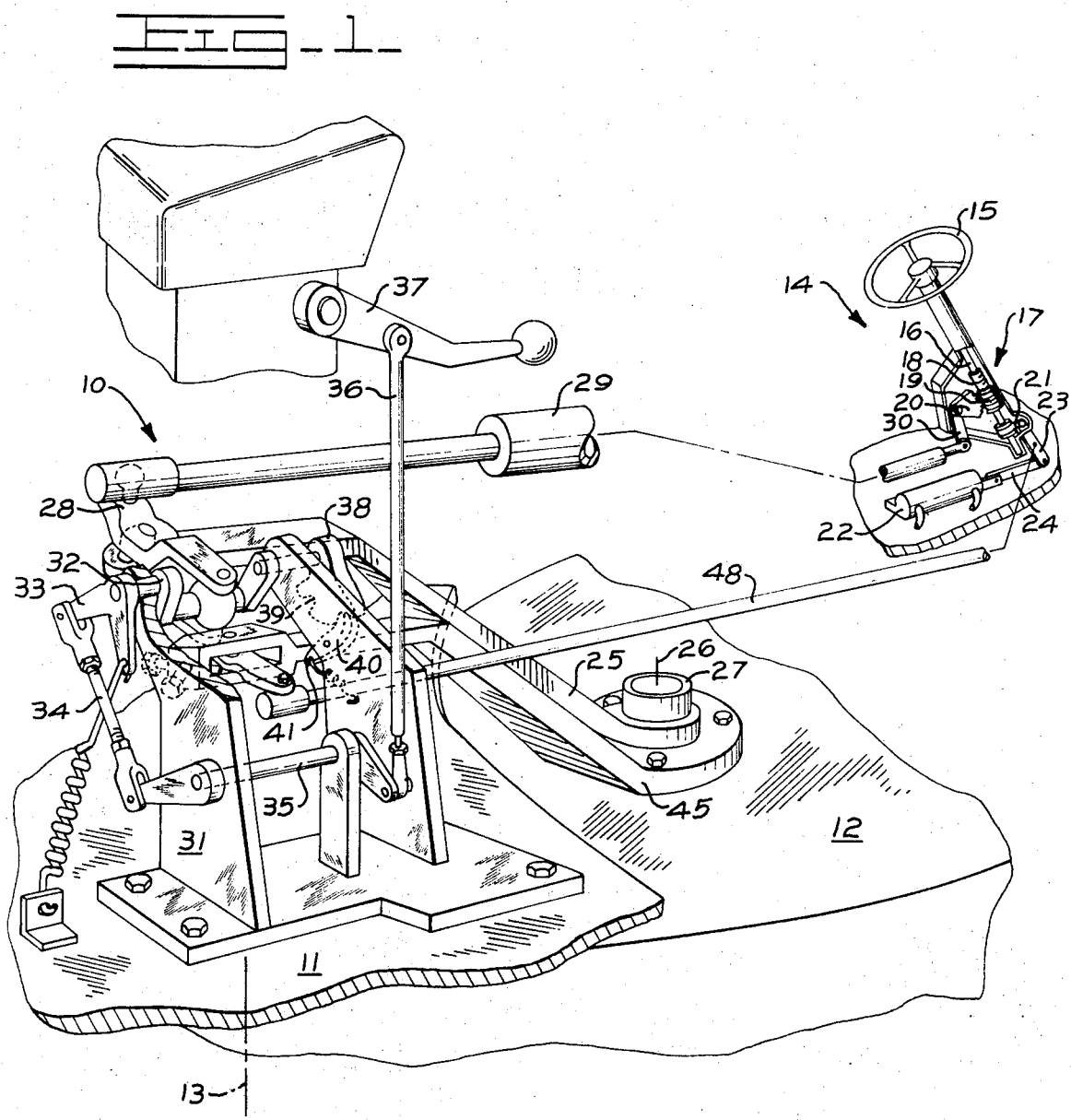
FIG. 1 is a perspective view of a steering mechanism embodying the present invention with fragments of the front and rear frames of the vehicle shown.

Referring to FIG. 1, a mechanism embodying the present invention is shown generally at 10 employed on an articulated vehicle having a rear frame 11 and a front frame 12 which are connected together by a pivot joint, not shown, defining a machine pivot axis 13.

A machine operator station 14, on a portion of the rear frame 11 of the vehicle which overhangs the front frame of the vehicle, includes a steering wheel 15 connected to a steering shaft 16 which in turn controls a steering gear shown at 17. The steering gear comprises a worm 18 provided on a shaft that is splined to steering shaft 16, a nut gear 19 engaging the worm, a steering sector 20 engaging the nut gear, and a control valve link 21 responsive to sliding of the worm and its shaft on steering shaft 16 to operate a control valve 22 through a spring-centered valve control lever 23 and a valve link 24 to control supply of fluid to the vehicle steering jacks (not shown).

A follow-up arm 25 has one end pivotally connected to the front portion of the vehicle at a point 26 off-set from the longitudinal center line of the vehicle by means of a bearing 27. The other end of the follow-up arm is pivotally connected to a follow-up linkage comprising a tie bar 28 which is pivotally connected to a link 29. Link 29 is also connected by a lever 30 to the steering sector, which is pivotally mounted on the forward extension of the rear frame of the vehicle.

To steer the vehicle, the steering wheel is turned, turning the steering shaft and the worm. The nut gear engaging the worm is held against longitudinal movement by the steering sector 20. Thus turning of the worm moves it up or down against the nut gear, which in turn causes the control valve link to activate the hydraulic control valve, actuating the steering jacks and effecting steering of the vehicle.

As one frame of the vehicle pivots with respect to the other about the vehicle pivot axis, which is the steering axis of the vehicle, the follow-up arm rotates about the vehicle pivot axis, moving tie bar 28 and link 29 which in turn rotates the steering sector. Rotation of the steering sector moves the nut gear up or down. When turning of the steering wheel ceases, relative movement of the worm with respect to the nut gear also ceases, allowing the steering sector to shift the nut gear and worm as a unit to re-center the hydraulic control valve to a neutral position.

If an external force begins to pivot one frame of the vehicle with respect to the other, the follow-up arm and linkage senses the movement, causing the steering sector to move the nut gear and worm to activate the control valve, which directs fluid to the steering jacks to resist the pivoting of the vehicle.

To provide for inactivation of the follow-up linkage for direct steering in lower speed ranges, tie bar 28 extends across control arm 25 to the vehicle pivot axis where it is connected to a crank 32 pivotally mounted in a frame 31 attached to the rear frame of the vehicle. Crank 32 is connected by means of a bell crank 33, link 34, crank 35, and link 36 to a control lever 37 mounted near the operator's station on the vehicle.

Movement of control lever 37 effects rotational movement of crank 32 which in turn causes lateral shifting of tie bar 28 until the pivotal connection of the tie bar to the follow-up arm 25 is disposed on the vehicle pivot axis. An arcuate detent cam 38 mounted on crank 32 and having first and second notches 39 and 40 provided therein engagable by a pawl 41 pivotally mounted on frame 31 define the two operative positions of control lever 37, crank 32 and tie bar 28.

Figure 2:
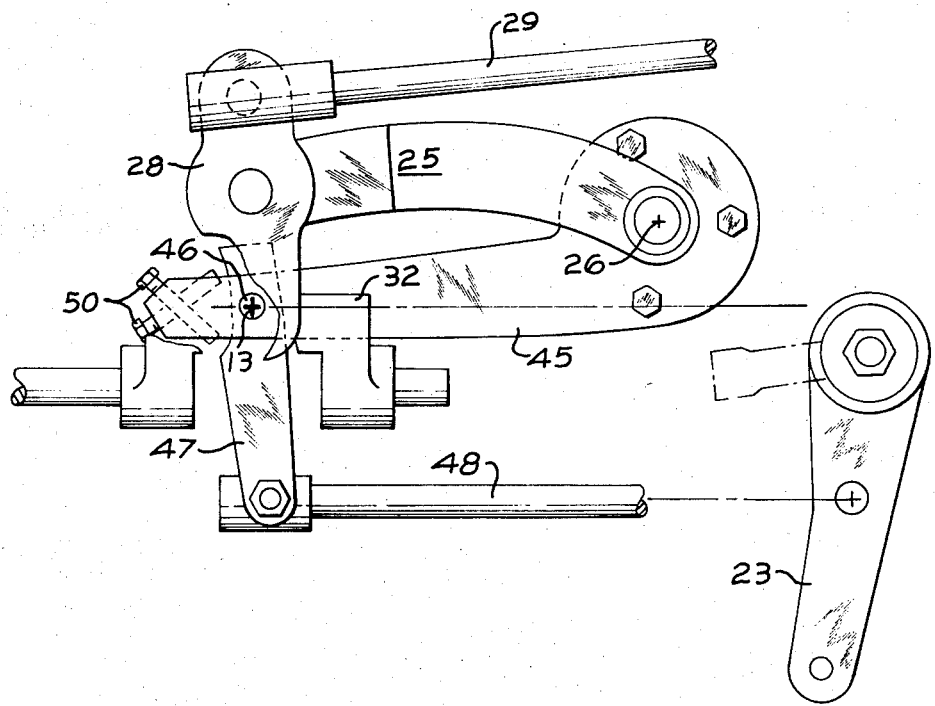
FIG. 2 is a top plan view of the follow-up linkage of the present invention in the follow-up steering configuration.

As illustrated in FIG. 2, when control lever 37 is in its first operating position, tie bar 28 is oriented in such a manner that the pivot connection between the tie rod and the follow-up arm is off-set from the vehicle pivot axis 13, and the pivot connection between the tie rod and crank 32 is disposed on the vehicle pivot axis. In this configuration, tie bar 28 and follow-up link 29 are sensitive to any rotation of pivot 26 about the pivot axis 13 of the vehicle to control the steering gear 17.

Figure 3:
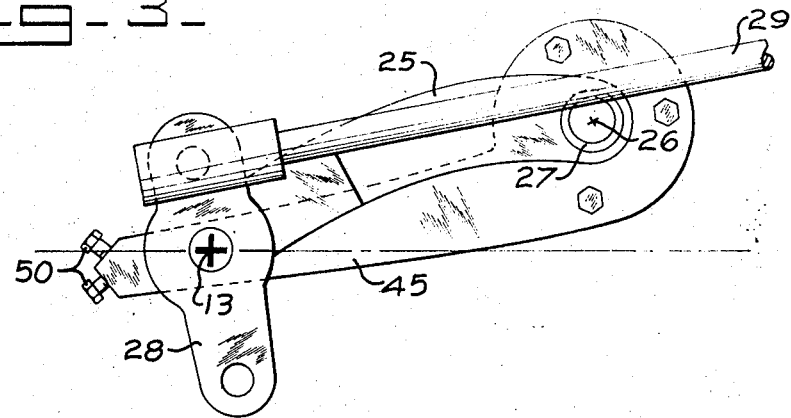
FIG. 3 is a top plan view of the follow-up linkage of the present invention in the direct steering configuration.

When control lever 37 is moved to its second operating position, as shown in FIG. 3, tie bar 28 will be shifted to a second position where the pivot connection between the tie bar and the control arm is located on the pivot axis of the vehicle. In this configuration, tie rod 28 and follow-up link 29 will be insensitive to rotation of point 26 about the main pivot axis of the vehicle and the follow-up linkage will not affect the steering gear 17 of the vehicle. Accordingly, any turning of steering wheel 15 will keep control valve 22 open, resulting in direct or "jerk" steering of the vehicle.

A vehicle articulation limit control is afforded by a control arm 45 attached to the front frame of the vehicle at a point off-set from the longitudinal center line of the vehicle. Control arm 45 extends rearwardly to a point 46 located along the pivot axis of the vehicle, where it is connected to one end of a lever 47. The other end of lever 47 is pivotally connected to a link 48 which in turn is connected to an intermediate point of spring centered valve control lever 23. As articulation of the vehicle occurs, control arm 45 will rotate with respect to lever 47 about pivot axis 13. The limits of articulation of the vehicle may be defined by adjustment of set screws 50 disposed in the end of control arm 45 and adapted to engage lever 47. As articulation of the vehicle reaches its limit, one of the set screws 50 will contact lever 47, causing it to rotate with control arm 45. Rotation of lever 47 will shift link 48, neutralizing hydraulic control valve 22.

I claim:

1. An articulated vehicle having a front frame, a rear frame, a pivot joint pivotally connecting the front frame to the rear frame and having an axis defining a vehicle pivot axis, a steering gear mounted on one of said front and rear frames and operable to pivot the front frame with respect to the rear frame about the vehicle pivot axis, a follow-up arm mounted on the other of said front and rear frames, follow-up linkage connected to the follow-up arm and to the steering gear means, and responsive to pivoting of the front frame with respect to the rear frame to control said steering gear means for follow-up steering, and means for selectively preventing the follow-up linkage from movng upon pivoting of the front frame with respect to the rear frame to effect direct steering of the vehicle.

2. The combination of claim 1 wherein said means comprises pivot means pivotally mounting said follow-up arm to one of said front and rear frames, and linkage means operable to rotate said follow-up arm to a configuration wherein the point of connection of the follow-up linkage to the follow-up arm is disposed on the vehicle pivot axis, whereby, upon pivoting of the front frame with respect to the rear frame, the follow-up arm will merely pivot about said point of connection to the follow-up linkage, allowing direct steering operation of the steering gear.

3. The combination of claim 2 wherein said follow-up linkage comprises a link having one end connected to the vehicle steering gear, and a tie bar having one end connected to the other end of said link, and an intermediate point connected to the follow-up arm, and wherein the other end of the tie bar is connected to said linkage means.

4. The combination of claim 1 further comprising limit means for limiting the articulation of the front frame with respect to the rear frame.

5. The combination of claim 4 wherein said limit means comprises a control arm mounted on the other of said front and rear frames from said steering gear and having an end extending therefrom to the vehicle pivot axis, a lever pivotally connected to the end of the control arm at the vehicle pivot axis, a control link connected to the lever remote from the vehicle pivot axis and to the steering gear, and adjustable pivot limit means in the end of the control arm for limiting pivoting of the lever with respect to the control arm whereby upon articulation of the vehicle the control arm will pivot about the vehicle axis and the lever until the adjustable pivot limit means contacts the lever, whereupon the lever will rotate with the control arm, moving the control link and activating the steering gear to prevent further articulation of the vehicle.

* * * * *